United States Patent Office 3,428,726
Patented Feb. 18, 1969

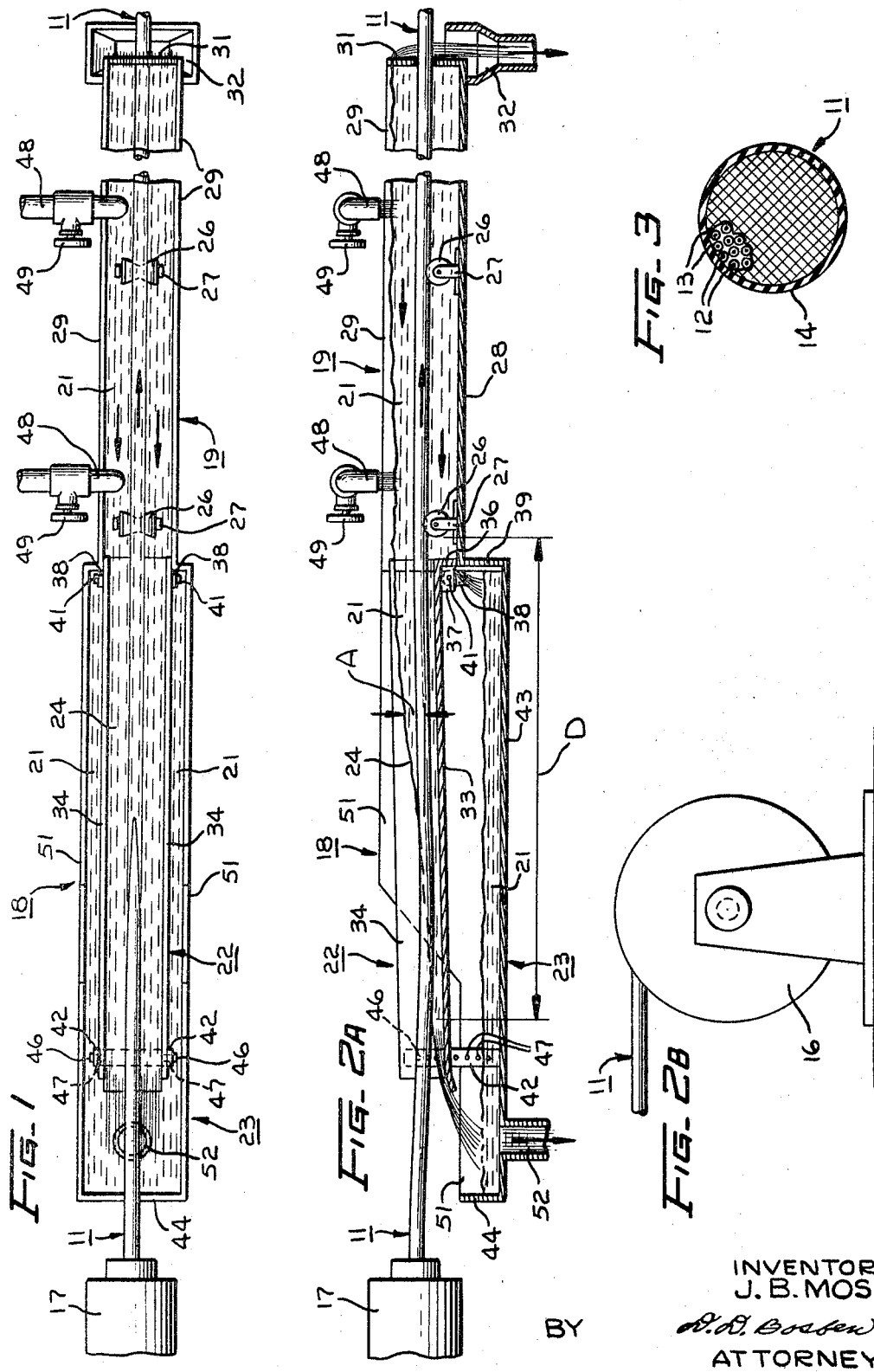

3,428,726
METHOD OF COOLING A JACKET FOR A STRAND
Joe B. Moss, Omaha, Nebr., assignor to Western Electric Company, Incorporated, New York, N.Y., a corporation of New York
Filed Mar. 30, 1965, Ser. No. 443,905
U.S. Cl. 264—237                                  8 Claims
Int. Cl. B29c *25/00*

ABSTRACT OF THE DISCLOSURE

In a method of cooling a jacket for a strand, the jacketed strand is advanced from jacketing apparatus into a body of cooling liquid which is open to the atmosphere, through an inclined surface of the cooling liquid so that it enters the cooling liquid at zero hydrostatic pressure and becomes progressively submerged in the cooling liquid, with the jacketed strand freely suspended between the jacketing apparatus and a first support point in the cooling liquid. The angle of inclination of the inclined surface of the cooling liquid is adjustable such that hydrostatic pressure does not press the jacket into firm contact with the strand to cause the jacket to adhere to and to melt portions of the strand, and such that by the time the jacketed strand reaches the first support point it has cooled and solidified to an extent that the supporting of the stand does not cause the jacket to tend to adhere to and to melt portions of the strand.

---

This invention relates to a method of cooling a jacket for a strand, and more particularly to a method of cooling a jacket for a strand in which the jacket is applied about the strand at a relatively high temperature. It is an object of this invention to provide a new and improved method of this character.

In the manufacture of certain types of communication cable, it is standard practice to advance the cable longitudinally from extrusion apparatus, which extrudes a hot and molten plastic jacket about insulated electrical conductor wires of the cable, to an elongated water cooling trough. The cooling trough includes a dam member adjacent a cable entrance end thereof for retaining the cooling water in the trough, and the jacketed cable enters the cooling trough through an opening in the dam member in relatively close relationship with respect to the edges of the opening so as to prevent any substantial leakage of the cooling water from the cooling trough through the opening. As a result of the dam member, the cooling water in the cooling trough is of substantial depth throughout the trough, including the portion of the trough adjacent the dam member, and as the jacketed cable enters the trough through the opening in the dam member it immediately becomes submerged in water of substantial depth.

This arrangement is undesirable because the hydrostatic pressure of the cooling water adjacent the dam member tends to press the still hot and relatively molten plastic jacket of the cable radially inward into firm contact with the insulating jackets of the cable conductor wires, causing the cable jacket to adhere to the conductor jackets and to melt the conductor jackets whereby the cable jacket and the conductor jackets become fused together. Similarly, the advancing cable tends to move laterally and the cable jacket wipes against the edges of the opening in the dam member so that, as in the case of the excessive hydrostatic pressure, the cable jacket is pressed radially inward firmly against the conductor jackets to cause adhesion of the cable jacket to the conductor jackets and melting of the conductor jackets. The wiping of the cable jacket against the edges of the opening in the dam member also tends to damage the cable jacket, as for example by scraping, cutting or distorting its shape. The net result frequently is a defective cable which must be repaired, or which is damaged so extensively that it must be scrapped.

Accordingly, another object of this invention is to provide a new and improved method of liquid cooling a jacket which is applied about a strand in a relatively hot and molten condition, in which external forces on the jacket which tend to damage the jacket and portions of the strand, are substantially eliminated.

A further object of this invention is to provide a new and improved method of liquid cooling a jacket which is applied to an advancing strand in a relatively hot and molten condition, in which external forces on the jacket which cause the jacket to tend to adhere to portions of the strand and to cause melting thereof, are substantially eliminated.

A still further object of the invention is to provide a new and improved method of liquid cooling a jacket on an advancing strand in which the strand is introduced into a body of cooling liquid at zero hydrostatic pressure and is progressively submerged in the cooling liquid. In accordance with the invention, in a method of cooling a jacket for portions of a strand in which the jacket and the portions of the strand are not to be fused to one another, in which the jacket is applied about the portions of the strand by jacketing apparatus at a relatively high temperature at which the jacket tends to adhere to and tends to melt the portions of the strand upon being pressed into firm contact therewith whereby the jacket and the portions of the strand become fused together, and in which the strand is advanced from the jacketing apparatus into a body of cooling liquid which is substantially open to the atmosphere, the flow in the body of cooling liquid is controlled to produce a surface of the cooling liquid which is slightly inclined with respect to the advancing strand and which intersects the strand about substantially its entire periphery so that the strand enters the cooling liquid at zero hydrostatic pressure and becomes progressively submerged in the cooling liquid. The angle of inclination of the inclined surface of the cooling liquid relative to the advancing strand and the extent of the inclined surface is such that hydrostatic pressure does not press the jacket into firm contact with the portions of the strand as the strand becomes submerged in the cooling liquid, at least until the jacket has been cooled to a relatively low temperature at which it does not tend to adhere to and to melt the portions of the strand.

More specifically, the invention involves cooling a jacket which is applied about a strand by jacketing apparatus in a relatively hot and molten condition such that external forces on the jacket tend to damage the jacket and portions of the strand. In accordance with the invention, the strand is advanced longitudinally from the jacketing apparatus into and through a body of cooling liquid, and the cooling liquid, adjacent the point of entry of the advancing strand, flows counter to the direction of advancement of the strand and in a volume sufficient to compensate for liquid pumping action of the advancing strand. This flow of the cooling liquid is controlled to produce a surface of the liquid which is slightly inclined with respect to the advancing strand and which intersects the strand about substantially its entire periphery, so that the strand enters the cooling liquid at zero hydrostatic pressure and becomes progressively submerged in the cooling liquid, and so that the external forces exerted on the jacket by hydrostatic pressure as the strand becomes submerged in the liquid are not sufficient to cause any substantial damage to the jacket and the portions of the strand. Further, the portion of the advancing strand between the jacketing apparatus and a first point of support in the cooling liquid is freely suspended and the distance from the point at which the jacket first engages the cooling liquid to the first strand support point is such that by the time the strand reaches the support point the jacket has been cooled and solidified so that the external forces exerted on the jacket by supporting of the strand cause no substantial damage to the jacket and the portions of the strand.

This invention, together with further objects and advantages thereof, will best be understood by reference to the following detailed description taken in connection with the accompanying drawing in which:

FIG. 1 is a partial plan view of apparatus in accordance with the invention;

FIG. 2A is a side elevational view in cross section of the apparatus shown in FIG. 1, taken substantially along its center line;

FIG. 2B is a schematic representation of a strand advancing mechanism which may be used in combination with the apparatus shown in FIGS. 1 and 2A; and FIG. 3 is a cross-sectional view of a jacketed communication cable.

Referring to FIG. 3 of the drawing, it is seen that the illustrated embodiment of the invention relates to the manufacture of communication cable 11 of the type including a plurality of electrical conductor wires 12 having plastic insulating jackets 13 and a plastic cable jacket 14 surrounding the thus insulated wires. More specifically, the invention is particularly advantageous in the manufacture of communication cable wherein the conductor jackets 13 and the cable jacket 14 are of the same or substantially the same type plastic or other material, and thus have equal or substantially equal melting points.

In the illustrated embodiment of the invention the cable 11 is advanced by a suitable takeup mechanism 16 (FIG. 2B) longitudinally to the right, as viewed in FIGS. 1 and 2, along a substantially horizontal path through an extrusion apparatus 17 which extrudes the cable jacket 14 about the conductor jackets 13. The jacketed cable 11 then proceeds into and through cooling apparatus 18 of this invention.

The cooling apparatus 18 includes an elongated primary container or trough 19 for holding cooling water 21, the trough being spaced a substantial distance horizontally from the extrusion apparatus 17. The cooling apparatus 18 also includes an elongated secondary container or trough 22 which is located between the primary trough 19 and the extrusion apparatus 17, and through which the cooling water 21 flows from the primary trough to the left, as viewed in FIGS. 1 and 2A, counter to the direction of advancement of the jacketed cable 11 and ultimately into a water collecting reservoir 23. Thus, it is seen that as the jacketed cable 11 is advanced by the takeup mechanism 16 from the extrusion apparatus 17, the cable enters the flowing cooling water 21 in the secondary trough 22 and then proceeds through the secondary trough and the primary trough 19 to the takeup mechanism.

The extrusion apparatus 17 extrudes the plastic cable jacket 14 about the plastic insulated conductor wires 12 in a hot and molten condition such that external forces on the cable jacket tend to cause damage to the cable jacket and the conductor jackets 13 of the wires. For example, an external force on the cable jacket 14 radially inward so as to press it into firm contact with the conductor jackets 13 tends to cause the cable jacket to adhere to the conductor jackets as it cools. Further, the cable jacket 14 tends to melt the conductor jackets 13 so that the cable jacket and the conductor jackets become fused together. An external force on the hot and relatively molten cable jacket 14 also may damage it in other ways, such as by scraping, cutting or distorting its shape. On the other hand, it has been found that if external forces on the hot and relatively molten cable jacket 14 can be prevented until the cable jacket has initially cooled and solidified, damage to the cable jacket and the conductor jackets 13 by external forces on the cable jacket can be substantially eliminated.

Thus, in accordance with this invention, the jacketed cable 11 enters the flowing cooling water 21 in the secondary cooling trough 22 through an upper surface 24 which is inclined slightly with respect to the longitudinal axis of the substantially horizontally moving cable at an angle designated A in FIG. 2A, whereby, since the cooling water in the trough is open to the atmosphere, the cable enters the cooling water at zero hydrostatic pressure. The inclined surface 24 of the cooling water 21 extends substantially the entire length of the secondary cooling trough 22, and as the jacketed cable 11 proceeds through the cooling water in the secondary trough, the cable becomes progressively submerged in the cooling water with the hydrostatic head on the cable progressively increasing. However, the angle of inclination A of the inclined surface 24 of the cooling water 21 with respect to the jacketed cable 11, and thus the rate of increase of the hydrostatic pressure relative to the rate at which the cable jacket 14 is being cooled and solidified by the cooling water, is selected such that the hydrostatic pressure does not press the cable jacket radially inward into firm contact with the conductor jackets 13, at least until the cable jacket has been cooled and solidified to an extent that it no longer tends to adhere to and to melt the conductor jackets.

Further in accordance with the invention, the jacketed cable 11 is suitably supported as it proceeds through the cooling water 21 in the primary cooling trough 19, as by rollers 26 rotatably mounted in yoke-like brackets 27 secured to a bottom wall 28 of the primary trough. The portion of the advancing jacketed cable 11 between the extrusion apparatus 17 and the first of the support rollers 26, however, is freely suspended so that until the cable reaches the first roller it does not engage any part of the cooling apparatus 18 which would tend to create an external force on the cable jacket so as to damage the cable jacket and the conductor jackets 13 as above described. In this regard, the distance from the point at which the jacketed cable 11 first engages the inclined surface 24 of the cooling water 21, to the first support roller 26, which distance is designated D in FIG. 2A, is selected such that by the time the jacketed cable reaches the first support roller the cable jacket 14 has been cooled and solidified to an extent that the external force exerted on the cable jacket by its engaging the roller does not result in any damage to either the cable jacket 14 or the conductor jackets 13.

The primary cooling trough 19, in addition to its bottom wall 28, includes laterally spaced side walls 29 which are upstanding from the bottom wall. The jacketed cable 11 enters the primary cooling trough 19 from the secondary cooling trough 22 through an open cable entrance end of the primary trough and exits from the primary trough through a suitable seal in a vertical end wall 31 of the trough. Thus, during an extruding and cooling operation, flow of the cooling water 21 out of the primary cooling trough 19 through its cable exit end is substantially precluded, except for a small amount which flows over the top of the end wall 31 and into a vertical water collecting pipe 32 of suitable construction, as a result of liquid pumping action of the advancing cable 11, whereas the cooling water can and does flow from the primary cooling trough through its open end into the secondary cooling trough 22 relatively freely.

The elongated secondary cooling trough 22 includes a bottom wall 33 and laterally spaced vertical side walls 34 which are upstanding therefrom, and is open at its opposite ends. Adjacent the right-hand open end of the secondary cooling trough 22, as viewed in FIGS. 1 and 2A, the cooling trough is pivotally mounted with this open end positioned in the open cable entrance end of the primary cooling trough 19 so that the cooling water 21 in the primary trough flows therefrom into the secondary trough, and then through the secondary trough out of its other open end into the collecting reservoir 23, as above described. More specifically, end portions of the vertical side walls 34 of the secondary cooling trough 22 extend adjacent respective ones of the vertical side walls 29 of the primary cooling trough 19 in close-fitting movable relationship with respect thereto. Further, the bottom wall 33 of the secondary cooling trough 22 is elevated relative to the bottom wall 28 of the primary cooling trough 19, and a dam member 36 depends from the bottom wall of the secondary trough to close the space between the bottom walls and thereby to preclude any substantial flow of the cooling water 21 in the primary trough through the space between the bottom walls. The dam member 36 functions to produce a relatively high water level or hydrostatic head in the primary cooling trough 19 adjacent the point at which the cooling water 21 flows from the primary cooling trough into the secondary cooling trough 22. Suitable water-tight seals may be provided between the side walls 29 and 34 of the cooling troughs 19 and 22, and between the lower end of the dam member 36 and the primary cooling trough's bottom wall 28, if so desired; however, such seals are not considered necessary and a small amount of cooling water leakage from the primary cooling trough into the collection reservoir 23 in these areas is permitted to occur, as indicated in FIG. 2A.

The pivotal mounting of the secondary cooling trough 22 may be accomplished in any suitable manner, and in the illustrated embodiment of the invention includes a pair of laterally spaced lugs 37 (FIG. 2A) secured to and depending from the bottom wall 33 of the trough. Each of the depending lugs 37 extends adjacent an associated one of a pair of laterally spaced lugs 38 fixedly mounted on a vertical end wall 39 of the water collecting reservoir 23, and each set of the lugs 37 and 38 includes a nut and bolt assembly 41, the bolt of which extends through aligned apertures in the lugs in a well-known manner.

The left-hand end of the secondary cooling trough 22, as viewed in FIGS. 1 and 2A, is supported by vertically extending legs 42 having their lower ends resting on a bottom wall 43 of the water collecting reservoir 23. Preferably, this end of the secondary cooling trough 22 is supported by the legs 42 at a level slightly below the level of the other end of the cooling trough so that the cooling water 21 flows through the trough in a relatively unimpeded manner. As the cooling water 21 flows through the secondary cooling trough 22 the above-mentioned relatively high hydrostatic head produced by the dam member 36 progressively decreases to form the upper surface 24 of the cooling water inclined at the slight angle A with respect to the advancing jacketed cable 11. Further, as is best shown in FIG. 2A, at this end of the secondary cooling trough 22 its bottom wall 33 includes a downwardly curved extension so that the cooling water 21, as a result of wetting action, follows the downwardly curved extension into the water collecting reservoir 23, instead of flowing directly outward and splashing over an adjacent end wall 44 of the reservoir onto the extrusion apparatus 17 and the surrounding area.

The upper portion of each of the support legs 42 is connected to its associated vertical side wall 34 of the secondary cooling trough 22 by suitable screws 46 (FIG. 1) extending through apertures 47 in the leg and screw threaded into the side wall, a plurality of the apertures 47 being provided in vertically spaced relationship so that the height of the associated end of the secondary cooling trough 22, and thus the inclination of the trough's bottom wall 33 with respect to the horizontal, can be adjusted. In this connection, as is best shown in FIG. 2A, since the advancing jacketed cable 11 is freely suspended between the extrusion apparatus 17 and the first support roller 26 in the primary cooling trough 19, the cable tends to sag downward by reason of its own weight by an amount substantially proportional to the size of the cable. Accordingly, while the position of the secondary cooling trough 22 shown in FIG. 2A would be suitable for a relatively light cable 11, for a relatively heavy cable 11 it usually is necessary to adjust the support legs 42 to lower the cable entrance end of the secondary cooling trough below this position so that the heavy advancing cable will not engage against the bottom wall 33 of the trough.

Provision for raising and lowering the cable entrance end of the secondary cooling trough 22, such as by the adjustable support legs 42, is particularly advantageous in instances where it is desired to run lighter cables 11 at faster line speeds than heavier cables, as is common practice in cable extrusion operations. In this regard, it is apparent from FIG. 2A that when the cable entrance end of the secondary cooling trough 22 is lowered for running a relatively heavy cable 11, the angle of inclination of the bottom wall 33 of the trough, and thus the angle of inclination A of the upper surface 24 of the cooling liquid 21 in the trough with respect to the horizontal will be increased. Accordingly, a lighter cable 11, having less sag than the heavier cable, would enter the cooling water 21 at a higher level than the heavier cable, thereby reducing the effective cooling length distance D of the cooling water before the cable engages the first support roller 26. Further, with the greater angle of inclination A of the upper surface 24 of the cooling water 21 and the more rapid rate of increase in hydrostatic pressure on the lighter and faster moving cable 11 as it becomes submerged in the cooling water, the hydrostatic pressure may compress the cable jacket 14 against the conductor jackets 13 before the cable jacket has cooled and solidified sufficiently to preclude damage to itself and the conductor jackets. Accordingly, after lowering the cable entrance end of the secondary cooling trough 22 for a relatively heavy cable 11, for a lighter cable it generally is necessary to raise the cable entrance end of the cooling trough back to an elevated position in order to maintain the angle A and the distance D at values suitable for proper cooling of the cable jacket 14.

In this connection, the range over which the cable entrance end of the secondary cooling trough 22 must be raised and lowered can be reduced, and depending upon the range in sizes of the cable 11 involved, possibly can be eliminated entirely, if so desired, by constructing the bottom wall 33 of the secondary trough with a downwardly curved configuration substantially corresponding to the path of travel of the heaviest cable through the trough. However, this curved bottom wall construction, which also requires that the trough side walls 34 have correspondingly curved lower edges, is disadvantageous as compared to the straight bottom wall construction shown in the drawing from a fabricating standpoint.

The cooling water 21 is continuously introduced into the primary cooling trough 19 at a pre-selected temperature through a plurality of inlet pipes 48 from a supply reservoir, which is not shown. Each of the inlet pipes 48 is provided with a control valve 49 for controlling the rate at which the cooling water 21 flows into the primary cooling trough 19, to maintain the water in the trough at a level such that it completely covers the advancing jacketed cable 11, and to insure a sufficient flow of water through the secondary cooling trough 22 to compensate for water pumping action of the advancing cable, that is, to insure a relatively constant flow of water in the secondary trough, as shown in FIGS. 1 and 2A of the drawing.

The water collecting reservoir 23, in addition to its bottom wall 43 and end walls 39 and 44, includes laterally spaced vertical side walls 51, and is welded, or otherwise suitably connected to the primary cooling trough 19. The vertical side walls 51 of the reservoir 23 are cut down adjacent the adjustable cable entrance end of the secondary cooling trough 22, as is best shown in FIG. 2A, to provide ready access to the adjustable support legs 42. The interconnected primary cooling trough 19 and reservoir 23 may be supported in the position shown in the drawing in any suitable manner, as for example, on a support frame, which is not shown.

The cooling water 21 in the reservoir 23, which flows therefrom through a vertical drain pipe 52, and the cooling water 21 flowing over the primary trough's end wall 31 into the vertical collecting pipe 32, is returned to the above-mentioned supply reservoir in any suitable manner, so that it may be reintroduced into the primary cooling trough 19 through the inlet pipes 48. For example, this water may flow through the pipes 32 and 52 to a common collection point from which it is pumped through a heat exchanger for cooling it to the above-mentioned preselected temperature, and then to the supply reservoir.

The critical angle of inclination A of the sloping upper surface 24 of the cooling water 21 in the secondary cooling trough 22 with respect to the jacketed cable 11, and the critical distance D from the initial point of engagement of the jacketed cable 11 with the sloping surface to the first support roller 26, in order to achieve proper cooling of the cable jacket 14, are dependent upon the rate at which the cable jacket cools as it proceeds through the cooling water in the secondary cooling trough, the angle A increasing as the cooling rate increases and the distance D decreasing as the cooling rate increases. The rate at which the cable jacket 14 cools is dependent on various factors such as cable line speed, the temperature of the cable jacket as it enters the cooling water 21, cooling water temperature, the type of material being used in the cable jacket, cable size, and cable jacket thickness. Further, in instances where the material of the cable jacket 14 and the material of the conductor jackets 13 have different melt temperatures, this must be taken into consideration.

By way of illustration, in the extension of a cable jacket 14 of polyvinyl material about conductor jackets 13 also of polyvinyl material, with the temperature of the cooling water 21 being introduced into the primary cooling trough 19 at approximately 70° F. and with a cable jacket water entry temperature of approximately 350° F., for a relatively small cable 11 having a cable jacket outer diameter of approximately four tenths of an inch and a cable jacket thickness of thirty-five thousandths of an inch, and being advanced at a line speed of two hundred and fifteen feet per minute, favorable results have been achieved with an angle of inclination A on the order of 3° and a distance D on the order of ten feet. Similarly, for a relatively large cable 11 having a cable jacket outer diameter of approximately one inch, a cable jacket thickness of thirty thousandths of an inch and a line speed of one hundred feet per minute, with the cable entrance end of the secondary cooling trough 22 lowered so that the cable does not scrape against the bottom wall 33 of the trough, and with other factors constant, favorable results have been achieved with an angle of inclination A on the order of 9° and a distance D on the order of eight feet. In these examples, the cable jacket 14 is cooled to approximately 300° F. by the time it enters the primary cooling trough 19 and engages the first support roller 26, at which temperature it has solidified to a sufficient extent that the effect of hydrostatic pressure in the primary cooling trough and the engagement of the cable with the first support roller results in no damage to the cable jacket or the conductor jackets 13.

In preparing for an extruding and cooling operation, the cable entrance end of the secondary cooling trough 22 is adjusted by means of the support legs 42 to a level such that the sagging portion of the cable 11 between the extrusion apparatus 17 and the first support roller 26 will not engage the bottom wall 33 of the secondary trough. Preferably, this setting is as high as possible so that the angle of inclination A of the cooling water surface 24 with respect to the longitudinal axis of the cable 11, and thus the rate of increase in hydrostatic pressure on the cable as it becomes submerged in the cooling water 21, is kept to a minimum, and so that the water cooling distance D before the cable engages the first support roller 26, is at a maximum. The flow of the cooling water 21 into the primary cooling trough 19 through the inlet pipes 48 also is adjusted by means of the control valves 49 so that the cooling water in the primary trough will completely cover the cable 11 as it is being advanced therethrough, and so that the cooling water will flow from the primary trough into and through the secondary cooling trough 22 in a volume sufficient to compensate for water pumping action of the advancing cable.

Adjacent the point at which the cooling water 21 flows from the primary cooling trough 19 into the secondary cooling trough 22, the dam member 36 causes the level of the cooling water to be maintained at a substantial depth and a relatively high hydrostatic head. As the cooling water 21 flows through the secondary trough 22 this relatively high hydrostatic head progressively decreases to form the slightly inclined surface 24 of the cooling water.

With the cooling apparatus 18 arranged as above described, the cable 11 is continuously advanced by the takeup mechanism 16 from left to right, as viewed in FIGS. 1 and 2, through the extrusion apparatus 17, which extrudes the cable jacket 14 about the jackets 13 of the conductor wires 12 in a hot and molten condition such that external forces on the cable jacket, if present, tend to damage it, and tend to press it firmly against the conductor jackets to cause it to adhere to the conductor jackets and to cause melting thereof. The jacketed cable 11 then proceeds into the cooling water 21 which is flowing through the secondary cooling trough 22 counter to the direction of advancement of the cable, and subsequently engages the first support roller 26 in the primary cooling trough 19.

The jacketed cable 11 enters the cooling water 21 in the secondary cooling trough 22 through the inclined surface 24 of the cooling water at zero hydrostatic pressure and becomes progressively submerged in the cooling water, with the hydrostatic head on the cable progressively increasing. However, the angle of inclination A of the inclined surface 24 of the cooling water relative to the advancing cable 11, and thus the rate of increase in hydrostatic pressure on the advancing cable, is such that the hydrostatic pressure does not press the cable jacket 14 firmly against the conductor jackets 13, at least until the cable jacket has been cooled and solidified to an extent that it no longer tends to adhere to and to melt the conductor jackets. Further, the cooling distance D from the point at which the jacketed cable 11 first engages the cooling water 21, to the first support roller 26, is such that by the time the jacketed cable reaches the first support roller the cable jacket has been cooled and solidified to an extent that its engaging the roller does not result in any damage to either the cable jacket 14 or the conductor jackets 13.

After passing over the first support roller 26 the jacketed cable 11 continues through the primary cooling trough 19 over the remaining support rollers 26 and exits from the trough through the seal in the end wall 31 to the takeup mechanism 16. The cooling water 21 flowing through the secondary cooling trough 22 discharges therefrom into the collecting reservoir 23 and ultimately flows from the collecting reservoir through the drain pipe 52. This cooling water 21, as well as the cooling water 21 flowing over the primary trough end wall 31 into the collecting pipe 32 as a result of pumping action of the advancing cable 11, is carried to a common collection point and subsequently is pumped back to the above-mentioned supply reservoir for reuse, as described hereinabove.

While one embodiment of the invention has been disclosed, many modifications will be apparent and it is intended that the invention be interpreted as including all modifications which fall within the true spirit and scope of the invention.

I claim:

1. In a method of cooling a jacket for portions of a strand in which the jacket and the portions of the strand are not to be fused to one another, in which the jacket is applied about the portions of the strand by jacketing apparatus at a relatively high temperature at which the jacket tends to adhere to and tends to melt the portions of the strand upon being pressed into firm contact therewith whereby the jacket and the portions of the strand become fused together, and in which the strand is advanced from the jacketing apparatus into a body of cooling liquid which is substantially open to the atmosphere, the improvement which comprises:

controlling flow of the cooling liquid adjacent the point at which the advancing strand enters the cooling liquid, to produce a surface of the cooling liquid which is slightly inclined with respect to the advancing strand and which intersects the strand about substantially its entire periphery so that the strand enters the cooling liquid at zero hydrostatic pressure and becomes progressively submerged in the cooling liquid, the angle of inclination of the inclined surface of the cooling liquid relative to the advancing strand and the extent of the inclined surface being such that hydrostatic pressure does not press the jacket into firm contact with the portions of the strand as the strand becomes submerged in the cooling liquid, at least until the jacket has been cooled from the relatively high temperature to a relatively low temperature at which it does not tend to adhere to and does not tend to melt the portions of the strand.

2. In a method of cooling a jacket for portions of a strand in which the jacket and the portions of the strand are not to be fused to one another, in which the jacket is applied about the portions of the strand by jacketing apparatus at a relatively high temperature at which the jacket tends to adhere to and tends to melt the portions of the strand upon being pressed into a firm contact therewith whereby the jacket and the portions of the strand become fused together, and in which the strand is advanced from the jacketing apparatus into a body of cooling liquid which is substantially open to the atmosphere, as recited in claim 1, the improvement which further comprises controlling flow of the cooling liquid to produce an angle of inclination of the inclined surface of the cooling liquid relative to the advancing strand of the order of 3–9 degrees.

3. In a method of cooling a jacket for portions of a strand in which the jacket and the portions of the strand are not to be fused to one another, in which the jacket is applied about the portions of the strand by jacketing apparatus in a relatively hot and molten condition such that external forces on the jacket tend to cause the jacket to adhere to and to melt the portions of the strand whereby the jacket and the portions of the strand become fused together, and in which the strand is advanced from the jacketing apparatus into a body of cooling liquid which is substantially open to the atmosphere, the improvement which comprises:

introducing the advancing strand into the cooling liquid at zero hydrostatic pressure and progressively submerging the strand in the cooling liquid at a rate such that external forces exerted on the jacket by hydrostatic pressure as the strand becomes submerged in the cooling liquid do not cause the jacket to adhere to and to melt the portions of the strand; and supporting the advancing strand in the cooling liquid at a point spaced a preselected distance from the point at which the jacket of the advancing strand first engages the cooling liquid, with the portion of the advancing strand between the jacketing apparatus and the strand support point freely suspended therebetween, the distance from the point at which the jacket first engages the cooling liquid to the strand support point being such that by the time the strand reaches the strand support point the jacket has been cooled and solidified to an extent that external forces exerted on the jacket by supporting the strand do not cause the jacket to tend to adhere to and to melt the portions of the strand.

4. In a method of cooling a jacket for a strand in which the jacket and the strand are not to be fused to one another, in which the jacket is applied about the strand by jacketing apparatus in a relatively hot and molten condition such that external forces on the jacket tend to cause the jacket to adhere to and to melt portions of the strand whereby the jacket and the portions of the strand become fused together, and in which the strand is advanced from the jacketing apparatus into a body of cooling liquid which is substantially open to the atmosphere, the improvement which comprises:

causing the cooling liquid to flow counter to the direction of advancement of the strand adjacent the point at which the strand enters the cooling liquid, and in a volume sufficient to compensate for liquid pumping action of the advancing strand;

controlling the flow of the cooling liquid adjacent the point at which the advancing strand enters the cooling liquid, to produce a surface of the cooling liquid which is slightly inclined with respect to the advancing strand and which intersects the strand about substantially its entire periphery so that the strand enters the cooling liquid at zero hydrostatic pressure and becomes progressively submerged in the cooling liquid, the angle of inclination of the inclined surface of the cooling liquid relative to the advancing strand and the extent of the inclined surface being such that external forces exerted on the jacket by hydrostatic pressure as the strand becomes submerged in the cooling liquid do not tend to cause the jacket to adhere to and to melt portions of the strand; and supporting the advancing strand in the cooling liquid at a point spaced a preselected distance from the point at which the jacket of the advancing strand first engages the cooling liquid, with the portion of the advancing strand between the jacketing apparatus and the strand support point freely suspended therebetween, the distance from the point at which the jacket first engages the cooling liquid to the strand support point being such that by the time the strand reaches the strand support point the jacket has been cooled and solidified to an extent that external forces exerted on the jacket by supporting the strand do not tend to cause the jacket to adhere to and to melt portions of the strand.

5. In a method of cooling a jacket for portions of a strand in which the jacket and the portions of the strand are not to be fused to one another, in which the jacket is applied about the portions of the strand by jacketing apparatus at a relatively high temperature at which the jacket tends to adhere to and to melt the portions of the strand upon being pressed into firm contact therewith whereby the jacket and the portions of the strand become fused together, and in which the strand is advanced from the jacketing apparatus into a body of cooling liquid which is substantially open to the atmosphere, the improvement which comprises:

controlling flow of the cooling liquid adjacent the point at which the advancing strand enters the cooling liquid, to produce a surface of the cooling liquid which is slightly inclined with respect to the advancing strand and which intersects the strand about substantially its entire periphery so that the strand enters the cooling liquid at zero hydrostatic pressure and becomes progressively submerged in the cooling liquid; and adjusting the angle of inclination of the inclined surface of the cooling liquid relative to the advancing strand such that hydrostatic pressure does not press the jacket into firm contact with the portions of the strand as the strand becomes submerged in the cooling liquid, at least until the jacket has been cooled from the relatively high temperature to a relatively low temperature at which it does not tend to adhere to and to melt the portions of the strand.

6. In a method of cooling a jacket for portions of a strand in which the jacket and the portions of the strand are not to be fused to one another, in which the jacket is applied about the portions of the strand by jacketing apparatus at a relatively high temperature at which the jacket tends to adhere to and to melt the portions of the strand upon being pressed into firm contact therewith whereby the jacket and the portions of the strand become fused together, and in which the strand is advanced from the jacketing apparatus into a body of cooling liquid which is substantially open to the atmosphere, as recited in claim 4, the improvement which further comprises adjusting the angle of inclination of the inclined surface of the cooling liquid relative to the advancing strand within a range on the order of 3–9 degrees.

7. In a method of cooling a jacket for portions of a strand in which the jacket and the portions of the strand are not to be fused to one another, in which the jacket is applied about the portions of the strand by jacketing apparatus at a relatively high temperature at which the jacket tends to adhere to and to melt the portions of the strand upon being pressed into firm contact therewith whereby the jacket and the portions of the strand become fused together, and in which the strand is advanced from the jacketing apparatus into a body of cooling liquid which is substantially open to the atmosphere, the improvement which comprises:

controlling flow of the cooling liquid adjacent the point at which the advancing strand enters the cooling liquid to produce a surface of the cooling liquid which is slightly inclined with respect to the advancing strand and which intersects the strand about substantially its entire periphery so that the strand enters the cooling liquid at zero hydrostatic pressure and becomes progressively submerged in the cooling liquid;

supporting the advancing strand in the cooling liquid at a point spaced a substantial distance from the point at which the jacket of the strand first engages the cooling liquid, with the portion of the strand between the jacketing apparatus and the strand support point freely suspended therebetween; and adjusting the angle of inclination of the inclined surface of the cooling liquid relative to the advancing strand such that hydrostatic pressure does not press the jacket into firm contact with the portions of the strand as the strand becomes submerged in the cooling liquid, at least until the jacket has been cooled from the relatively high temperature to a relatively low temperature at which it does not tend to adhere to and to melt the portions of the strand, and such that by the time the strand reaches the strand support point the jacket has been cooled and solidified to an extent that external forces exerted on the jacket by supporting the strand do not cause the jacket to tend to adhere to and to melt the portions of the strand.

8. In a method of cooling a jacket for portions of a strand in which the jacket and the portions of the strand are not to be fused to one another, in which the jacket is applied about the portions of the strand by jacketing apparatus at a relatively high temperature at which the jacket tends to adhere to and to melt the portions of the strand upon being pressed into firm contact therewith whereby the jacket and the portions of the strand become fused together, and in which the strand is advanced from the jacketing apparatus into a body of cooling liquid which is substantially open to the atmosphere, as recited in claim 7, the improvement which further comprises adjusting the angle of inclination of the inclined surface of the cooling liquid relative to the advancing strand within a range on the order of 3–9 degrees.

References Cited

UNITED STATES PATENTS

| 1,740,029 | 12/1929 | Moomy | 264—180 |
| 2,114,758 | 4/1938 | Young | 264—348 |
| 2,294,555 | 9/1942 | Hendrie | 264—237 |
| 2,338,770 | 1/1944 | Legvillon | 264—348 |
| 2,561,820 | 7/1951 | Ramsey et al. | 264—348 |
| 3,249,666 | 5/1966 | French | 264—173 |
| 3,227,656 | 6/1965 | Bill et al. | 264—180 |

JULIUS FROME, *Primary Examiner.*

A. H. KOECKERT, *Assistant Examiner.*

U.S. Cl. X.R.

62—63; 264—348